Patented Dec. 6, 1932

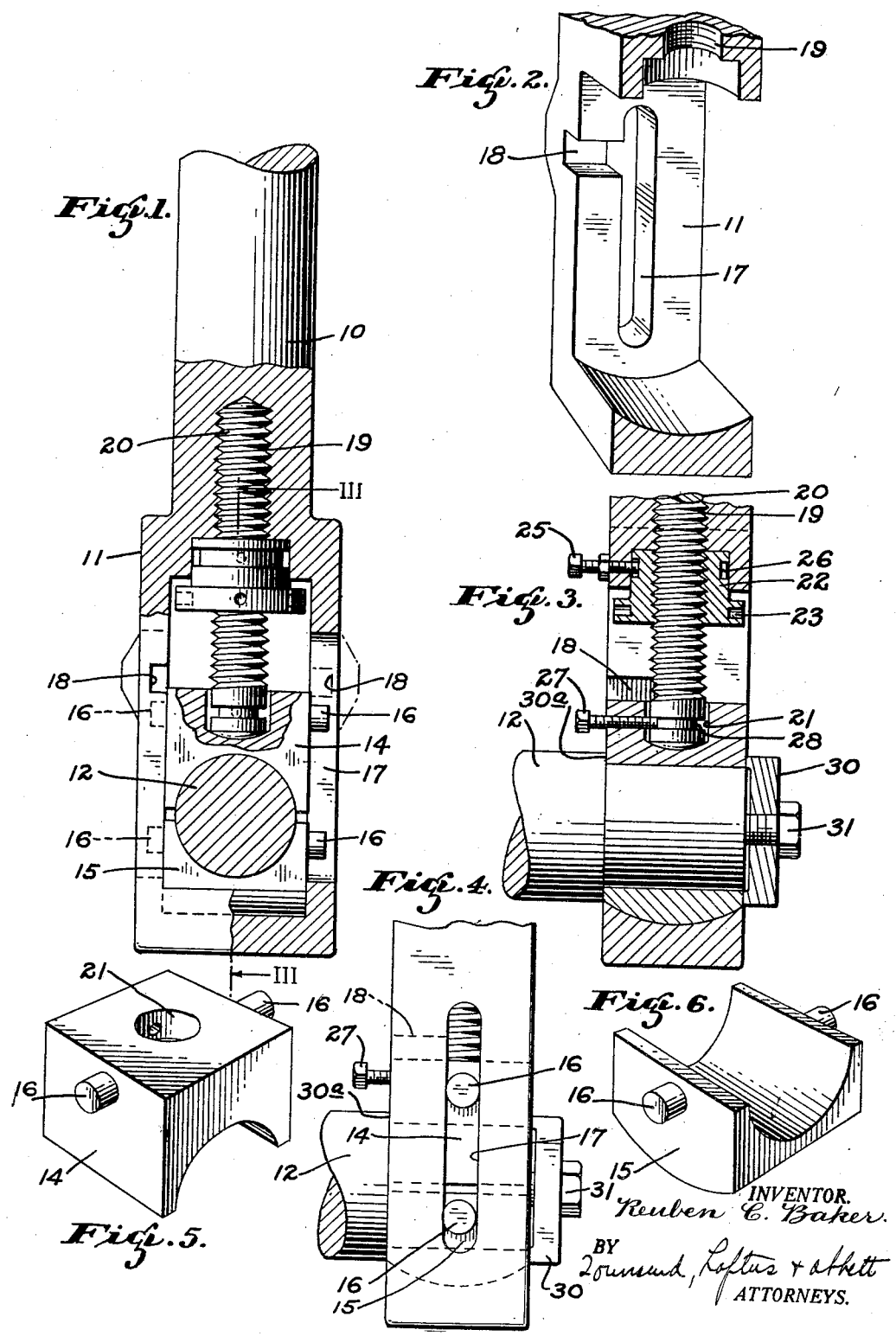
Dec. 6, 1932. R. C. BAKER 1,890,207
PITMAN BEARING
Filed Jan. 21, 1930

1,890,207

UNITED STATES PATENT OFFICE

REUBEN C. BAKER, OF COALINGA, CALIFORNIA, ASSIGNOR TO BAKER OIL TOOLS, INC., OF HUNTINGTON PARK, CALIFORNIA, A CORPORATION OF CALIFORNIA

PITMAN BEARING

Application filed January 21, 1930. Serial No. 422,352.

The present invention relates to pitman bearings and more particularly to an adjustable and removable bearing for well pumping rigs.

It is the principal object of the present invention to provide an improved self-aligning pitman bearing that may be quickly adjusted relative to or entirely disengaged from the wrist pin journalled in it.

One form which the invention may assume is exemplified in the following description and illustrated by way of example in the accompanying drawing, in which:

Fig. 1 is a fragmentary view of a wrist pin bearing assembly,

Fig. 2 is a fragmentary view in perspective showing details of the bearing housing in a pitman, Fig. 3 is a sectional view taken on the line III—III of Fig. 1, Fig. 4 is an elevation of the view shown in Fig. 3, Fig. 5 is a perspective view of the upper bearing block used in combination with the assembly shown in Fig. 1, and Fig. 6 is a similar view of the lower bearing block.

Referring more particularly to the accompanying drawing, I show a pitman 10 formed with a bearing housing 11. A wrist pin 12 is journalled between an upper bearing block 14 and a lower bearing block 15 mounted in the housing 11. The bearing blocks 14 and 15 are slidably and pivotally mounted in the housing 11 by means of studs 16 extending from their sides and engaging a pair of opposed slots 17 formed in the sides of the housing 11. Grooves 18 are formed in the housing and communicate with the slots 17 to permit the insertion and removal of the blocks.

A threaded hole 19 is formed in the pitman 10 centrally of the housing 11 and at one end thereof to receive a threaded adjusting bar 20. The lower end of the bar 20 engages a socket 21 formed centrally in the upper bearing block 14. It will be seen that the bearing blocks may be fitted as tightly or loosely as desired about the wrist pin 12 by adjustment of the threaded bar 20. A lock nut 22 threaded upon the bar 20 may be screwed against a recessed portion of the housing as shown in Figs. 1 and 2 to lock the bar against turning. The lock nut 22 has holes 23 formed in its outer cylindrical surface for the engagement of a spanner wrench or turn pin. A set screw 25 bearing upon an annular groove 26 in the lock nut holds the nut in its tightened position.

A set screw 27 is fitted to the upper bearing block and engages an annular groove 28 in the lower end of the bar 20 whereby the bar is fastened in the socket 21.

A suitable collar 30 is secured to the end of the wrist pin 12 by means of a key 31. This collar 30 and a shoulder 30a prevents end movement of the wrist pin within the bearing.

The convex arcuate surface of the lower bearing block 15, engaging a complementary surface in the housing combined with the slightly curved contact between the bar 20 and the upper block 14, permits the bearing blocks to pivot at the studs 16. This pivoting allows the blocks to automatically align themselves with relation to the wrist pin 12.

It is evident from the foregoing description that I have provided a self-aligning bearing that is not only adapted to the easy removal of the shaft that is journalled in it but may be quickly and simply taken apart for repairing or easily adjusted for adaption to varying conditions or to compensate for the wear of its parts.

While I have shown a preferred embodiment of my invention, it should be understood that various changes may be made in its construction without departing from the spirit and scope of the appended claims.

Having thus described my invention, what I claim and desire to secure by Letters Patent is:

1. In a bearing, the combination of a substantially rectilinear housing having slots in its sides and a threaded hole in one end thereof, a pair of bearing blocks contained by the housing, lugs formed on the blocks and slidably engaging said slots, said housing also having grooves formed between said slots and its outer surface to permit removal of the bearing blocks, a threaded rod in said threaded hole adapted to be screwed against said bearing blocks whereby they may be adjusted, and means for securing said rod in position to maintain the adjustment.

2. In a bearing, the combination of a rectilinear shaped housing having slots formed in its sides, a concave surface in one end and a threaded hole in its other end, a lower bearing block conforming to said concave surface, an upper bearing block cooperating with the other block to receive a shaft, lugs formed on each of said bearing blocks for engagement with said slots whereby the bearing blocks may be pivotable within said housing and removable from said housing, a threaded bar extending from said threaded hole and engaging said upper bearing block for adjustment thereof, and lock nut on the bar and engaging the housing for securing said bar against movement.

3. A bearing of the character described comprising a housing having a rectilinear shaped opening therein, a pair of slots in the housing at opposite sides of said opening, grooves one at each end of said slots and extending through the face of the housing, the opposite end of said housing being formed with a concave surface, the end of the housing opposite the concave surface being formed with a tapped recess, a pair of bearing blocks adapted to fit within said opening in the housing, a lug extending from each end of each bearing block and insertable through said grooves for engagement with said slots to pivotally support said bearing blocks within the housing, a threaded bar threaded into said tapped recess and loosely connected at its lower end to the adjacent bearing block, and a nut threaded on said bar for adjusting the bearing blocks relative to each other.

REUBEN C. BAKER.